(12) United States Patent
Jones (10) Patent No.: US 10,928,223 B2
(45) Date of Patent: Feb. 23, 2021

(54) INDUCTIVE SENSOR DEVICE

(71) Applicant: Sagentia Limited, Cambridge (GB)

(72) Inventor: Ross Jones, Cambridge (GB)

(73) Assignee: Sagentia Limited, Cambridge (GB)

( * ) Notice: Subject to any disclaimer, the term of this patent is extended or adjusted under 35 U.S.C. 154(b) by 0 days.

(21) Appl. No.: 16/335,617

(22) PCT Filed: Sep. 7, 2017

(86) PCT No.: PCT/EP2017/072526
§ 371 (c)(1),
(2) Date: Mar. 21, 2019

(87) PCT Pub. No.: WO2018/054697
PCT Pub. Date: Mar. 29, 2018

(65) Prior Publication Data
US 2019/0301896 A1    Oct. 3, 2019

(30) Foreign Application Priority Data

Sep. 22, 2016  (EP) .................................... 16190081

(51) Int. Cl.
*G01D 5/20* (2006.01)
*G01B 3/20* (2006.01)
(Continued)

(52) U.S. Cl.
CPC ........... *G01D 5/2053* (2013.01); *G01B 3/205* (2013.01); *G01B 7/003* (2013.01); *G01D 5/248* (2013.01); *G01D 5/2497* (2013.01)

(58) Field of Classification Search
CPC .... G01D 5/2053; G01D 5/2497; G01D 5/248; G01B 3/205; G01B 7/003
(Continued)

(56) References Cited

U.S. PATENT DOCUMENTS 5,886,519 A     3/1999   Masreliez
5,973,494 A  *  10/1999  Masreliez ............ G01D 5/2046
                                                       324/207.17
(Continued)

FOREIGN PATENT DOCUMENTS

CN      1431457 A    7/2003
CN    101424508 A    5/2009
(Continued)

OTHER PUBLICATIONS

International Search Report dated Nov. 8, 2017, for International Application No. PCT/EP2017/072526 (11 pages).
(Continued)

*Primary Examiner* — Christopher P McAndrew
(74) *Attorney, Agent, or Firm* — Fitch, Even, Tabin & Flannery LLP (57) ABSTRACT

An inductive sensor device (23) having a scale unit (24) and a sensor unit (25) that can be moved relative to each other in a measuring direction (M) is described. The scale unit contains scale elements (26) that are adapted to create a field pattern (P(x)) in measuring direction (M) that is detected by means of a receive circuit (35) of the sensor unit (25). The receive circuit (35) contains at least a first receive coil set (36) and a second receive coil set (37) that are offset in measuring direction (M). In so doing a first spatial phase and a second spatial phase receive signal is provided by these receive coil sets (36, 37) respectively. These spatial phases can be used for absolute position determination.

15 Claims, 4 Drawing Sheets

(51) Int. Cl.
   *G01B 7/00*     (2006.01)
   *G01D 5/248*    (2006.01)
   *G01D 5/249*    (2006.01)

(58) Field of Classification Search
   USPC .................................................. 324/207.15
   See application file for complete search history.

(56) References Cited

U.S. PATENT DOCUMENTS

| | | | |
|---|---|---|---|
| 6,054,851 A * | 4/2000 | Masreliez | G01D 5/2053 |
| | | | 324/207.17 |
| 6,335,618 B1 | 1/2002 | Nahum | |
| 6,545,463 B1 * | 4/2003 | Dettmann | G01D 5/145 |
| | | | 324/207.21 |
| 6,853,183 B2 | 2/2005 | Kindler | |
| 7,449,878 B2 | 11/2008 | Lee | |
| 7,521,922 B2 | 4/2009 | Stuve | |
| 7,705,585 B2 | 4/2010 | Howard | |
| 9,217,628 B2 | 12/2015 | Howard | |
| 9,417,094 B2 | 8/2016 | Cook et al. | |
| 9,612,136 B1 | 4/2017 | Cook | |
| 9,671,477 B2 | 6/2017 | Vaysse et al. | |
| 2010/0141244 A1 * | 6/2010 | Bartos | G01D 5/12 |
| | | | 324/207.21 |
| 2013/0119978 A1 | 5/2013 | Freise | |

FOREIGN PATENT DOCUMENTS

| | | |
|---|---|---|
| CN | 201787917 U | 4/2011 |
| CN | 102223046 A | 10/2011 |
| DE | 102014220458 A1 | 4/2016 |
| EP | 2581711 A2 | 4/2013 |
| JP | 6258880 B2 | 1/2018 |

OTHER PUBLICATIONS

European Search Report and Search Opinion dated Mar. 10, 2017, for European Application No. 16190081.6 (6 pages).

Chinese Office Action and Search Report dated Nov. 30, 2020, in corresponding Chinese Application No. 201780058566.1, with English translation (19 pages).

* cited by examiner

INDUCTIVE SENSOR DEVICE

CROSS REFERENCE TO RELATED APPLICATIONS

This patent application is the national phase of PCT/EP2017/072526, filed Sep. 7, 2017, which claims the benefit of European Patent Application No. 16190081.6, filed Sep. 22, 2016.

TECHNICAL FIELD

The present invention refers to the technical field of inductive sensor devices. Such inductive sensor devices can be used for determination of a relative position between two parts that are moveable relative to each other in a linear and/or circular direction. Such inductive sensor devices can be used for measuring instruments like calipers, micrometer gauges, test indicators, touch probes and other measuring instruments.

BACKGROUND

An inductive sensor device is for example disclosed in U.S. Pat. No. 5,886,519. A scale unit is provided with a number of scale elements, arranged in at least one line in a measuring direction. The scale elements of one common line have the same scale pitch. For each line of scale elements a sensor unit containing a transmit coil and at least one receive coil is provided. The transmit coil creates a magnetic field, that is varied by means of the scale elements. Depending on the relative position between the sensor unit and the scale unit, a field pattern is thus created that is detectable by means of the respective receive coil. A receive signal provided by each receive coil can be used to determine a relative position between the sensor unit and the scale. It is proposed that receive coils assigned to different lines of scale elements are provided with different wavelengths respectively. In so doing an absolute position sensor device is obtained.

The inductive sensor device disclosed in U.S. Pat. No. 6,335,618 B1 provides scale elements that extend in a plane spanned by the measuring direction and a height direction perpendicular to the measurement direction. The scale elements have varying dimensions in the height direction depending on their position in measuring direction. In so doing the amplitude of the receive signal is modulated. Such an inductive sensor is more sensitive to displacements in the height direction.

U.S. Pat. No. 7,705,585 B2 shows an inductive sensor device having a scale element with holes. The dimension of the holes can vary in measuring direction in order to create an aperiodic pattern for absolute position measurement. Due to the variation of the dimension of the scale element, the sensor device is also sensitive to a displacement in height direction perpendicular to the measurement direction. Moreover, the varying area amount of the holes could lead to reduced signal amplitudes and could make the device sensitive to noise.

The absolute position sensor device disclosed in EP 2 581 711 A2 proposes to have two lines of scale elements with different pitches for absolute position determination.

U.S. Pat. No. 9,217,628 proposes an inductive sensor device with one single line of scale elements. The at least one receive coil of the sensor unit has along its extension in measuring direction a varying wavelength. The receive winding and a transmit winding extend along a scale unit over the entire measurement path. Moveable relative to the sensor unit is a target unit that contains two resonant circuits, each having a capacitor and a laminar winding that forms the inductance. The resonant circuits have different resonant frequencies. The transmit coil of the scale unit is energized by means of two different AC frequencies. The target unit position along the scale unit can be determined depending on the two signals received in the receive coil based on the two transmit AC frequencies. This device uses different frequencies for obtaining two receive signals that allow absolute position detection. Such a device is complex and costly.

In view of the known prior art, an object of the present invention is to provide a simple inductive sensor device that allows absolute position measurement with high accuracy and requires little space.

SUMMARY

This object is achieved by means of an inductive sensor device as described below.

The inductive sensor device comprises a scale unit having scale elements that are arranged in at least one line extending in a measuring direction. The scale elements are adapted to create a field pattern in measuring direction. A sensor unit is provided that comprises a receive circuit. The receive circuit has at least a first receive coil set and a second receive coil set to detect the field pattern. The first and second receive coil sets are displaced relative to each other in measuring direction. The sensor unit and the scale unit are moveable relative to each other in measuring direction. Each receive coil set includes at least two receive coils.

One line of scale elements is sufficient. An additional line of scale elements can be advantageous in some embodiments. The scale elements of one common line all have the same dimensions in measuring direction and preferably also in a height direction that extends perpendicular to the measuring direction.

At least one of the lines of scale elements has a varying pitch or spacing between the scale elements in measuring direction. The pitch is equal to the dimension of one scale element in measuring direction plus the spacing in between two directly adjacent scale elements. Since the dimension in measuring direction of the scale elements in one line is constant, the pitch is varied by means of a variation of the spacing between two directly adjacent scale elements. Preferably this spacing is defined by means of a non-linear function depending on a position variable that characterizes the position between the scale unit and the sensor unit in measuring direction.

Depending on the relative position in measuring direction, the receive coil sets each create a respective receive signal that can be used for absolute position detection. The function that defines the spacing between the scale elements can be determined in order to provide for a sufficient long range in which absolute position determination is possible and in order to make the sensor device less sensitive to noise.

Preferably the receive circuit is adapted to determine a first spatial phase of a first receive signal provided by the first receive coil set and a second spatial phase of a second receive signal provided by the second receive coil set. The spatial phases of the two receive coil sets have different gradients at one location in measuring direction. Therefore, the phase detection allows for absolute position determination. The position determination can be made by using a look-up table or by calculation based on the respective first and second phases.

In a preferred embodiment the first receive coil set and the second receive coil set are displaced at a coil distance in measuring direction and extend along a common longitudinal axis in measuring direction. The coil distance is preferably large enough, so that the first and second receive coil set do not overlap, but a gap exists in between.

In some preferred embodiments the first receive coil set and the second receive coil set have the same length in measuring direction. More preferably the two receive coil sets can be identical. This means that if one of the receive coil sets is shifted in measuring direction until it covers the respective other receive coil set, the two receive coil sets coincide. The dimension of the first and second receive coil set in height direction can for example substantially correspond to the height of the scale elements.

The scale unit can comprise an additional line of scale elements that preferably all have the same dimension in measuring direction and optionally also in height direction. In one embodiment this additional or second line of scale elements can have a constant spacing and thus a constant pitch that does not vary along the measuring direction. In another embodiment this additional or second line can have a varying spacing, wherein the variation of the spacing of the second line differs from the variation of the spacing of the first line of scale elements. More precisely the first line of scale elements can have a first spacing defined by a non-linear first function and the second line of scale elements can have a second spacing defined by a preferably linear second function. Such additional lines allow a coarse and at least one finer resolution for the position determination and therefore an extended measurement range in measuring direction can be achieved without decrease of the accuracy.

If more than one line of scale elements is provided, the sensor unit can advantageously contain a third receive coil set having at least one receive coil assigned to the additional line of scale elements. The third receive coil set is preferably arranged adjacent to the first and/or second receive coil set in height direction. In one preferred embodiment the third receive coil set has a length larger than the length of the first and/or second receive coil sets in measuring direction. The length of the third receive coil set is for example 1.5 times to 2.5 times longer than the first and/or second receive coil set.

Each scale element has two opposite sides in measuring direction, wherein one side forms a loop front and the other side forms a loop back. The loop front and the loop back can have identical shapes. In other words, if the loop front would be shifted in measuring direction onto the loop back, the loop front and the loop back would completely coincide. In one preferred embodiment the scale element can surround a substantially rectangular area.

Preferably the scale elements contain or are formed by scale loops that are arranged adjacent to each other in measuring direction. Each scale element can be formed by one single scale loop. Each scale loop can completely surround a loop area and forms a closed loop.

Preferably the scale elements are passive field-influencing elements. In such an embodiment a transmit circuit is present that comprises at least one transmit coil adapted to create a magnetic field. The scale elements vary the magnetic field in order to create the field pattern in measuring direction.

It is also preferred that the transmit circuit is part of the sensor unit. In some embodiments a separate transmit coil can be assigned to each of the receive coil sets. Preferably the transmit coil surrounds the assigned receive coil set. It is also possible that one transmit coil is provided for each separate line of scale elements, so that one single transmit coil is assigned to the first and second receive coil set.

All of the coils and/or loops can be laminar. Preferably the receive coils and optionally also the at least one transmit coil is provided on a circuit board. The circuit board can have different layers. Each of the receive coils can be formed by a first conductor and/or a second conductor arranged on different layers of the circuit board.

It is also advantageous that all of the receive coil sets extend along a respective axis parallel to the measuring direction and that each receive coil has a mirror symmetric contour with regard to this axis.

BRIEF DESCRIPTION OF THE DRAWINGS

Preferred embodiments of the present invention are disclosed in the dependent claims, the specification and the drawings. In the following preferred embodiments of the invention are explained in more detail referring to the attached drawings. In the drawings:

DETAILED DESCRIPTION

Figures 1, 2:
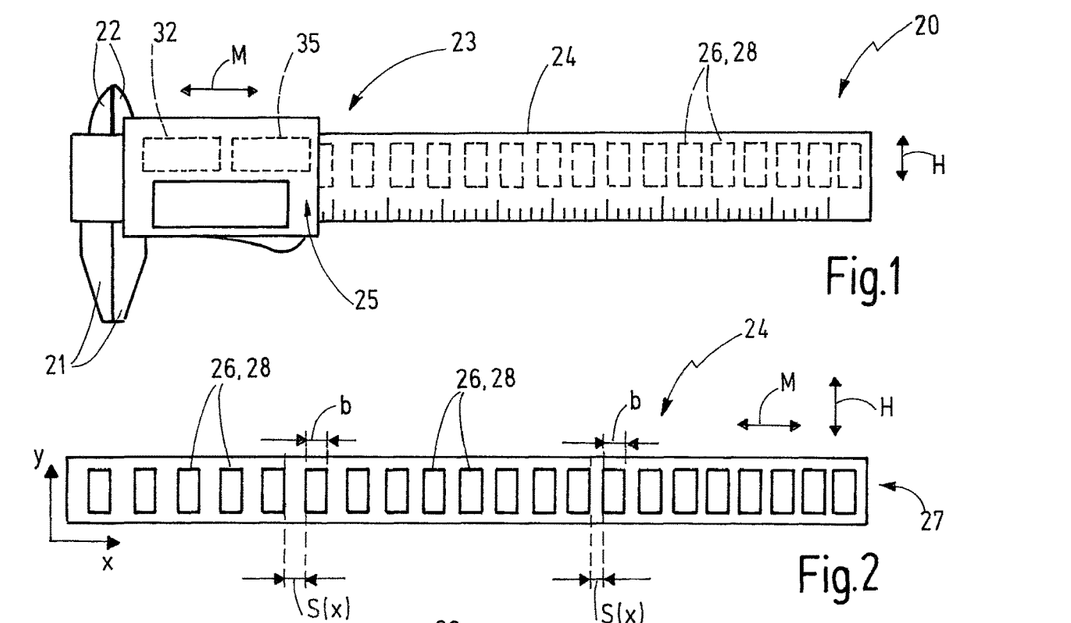
FIG. 1 shows a schematic top view of a measuring instrument that can be equipped with an inductive sensor device.
FIG. 2 shows a schematic top view of one embodiment of a scale unit containing scale elements.
Figure 3:
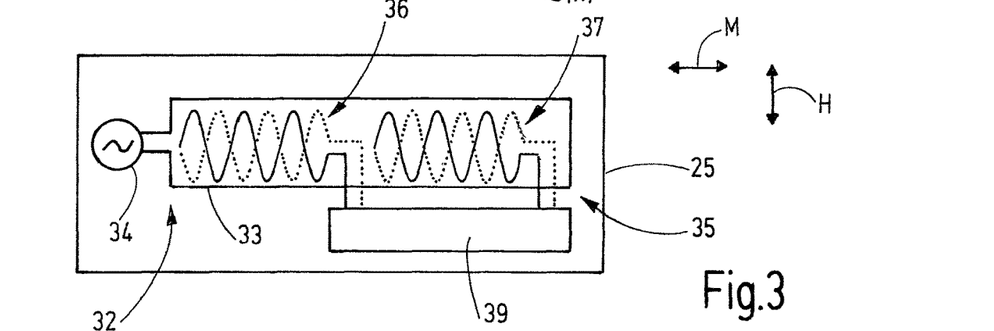
FIG. 3 is a schematic illustration of an embodiment of a sensor unit containing a transmit circuit and a receive circuit.
Figure 8:
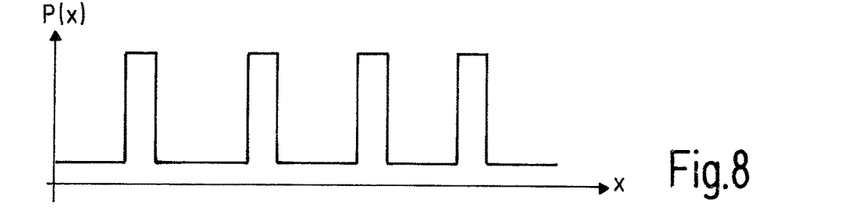
FIG. 8 shows a schematic field pattern created due to the variation of a magnetic field by means of the scale elements.

FIG. 1 shows a schematic illustration of an exemplary measuring instrument 20 in form of a caliper. The caliper is realized as digital caliper for measuring a distance between inside jaws 21 and/or outside jaws 22 of an object. A distance is measured by means of an inductive sensor device 23. The inductive sensor device 23 includes a scale unit 24 and a sensor unit 25 that are moveable relative to each other in a measuring direction M. The scale unit 24 contains a number of scale elements 26 that are arranged in at least one line 27 extending in measuring direction M. The scale elements 26 are adapted to create a field pattern P(x) in measuring direction M (compare FIG. 8), wherein x is a position variable that describes the relative position between the sensor unit 25 and the scale unit 24 in measuring direction M and in the present example the position of the sensor unit 25 along the scale unit 24.

In the preferred embodiment the scale elements 26 contain electrically conductive material. The scale elements 26 are not connected with each other, but are separate non-connected elements. As schematically illustrated in the drawings, each scale element 26 is formed by a scale loop 28 and particularly by one single scale loop 28. The scale elements 26 or scale loops 28 respectively are in the present example passive field-influencing elements and create the field pattern P(x) by varying or modifying a magnetic field B.

According to the preferred embodiments, the inductive sensor device 23 and preferably the sensor unit 25 contains a transmit circuit 32 having at least one transmit coil 33 and an AC voltage source 34 that is connected to the at least one transmit coil 33. Due to the alternating current, the transmit coil 33 creates a magnetic field B having circular field lines around a conductor or loop of the transmit coil 33. Preferably each transmit coil 33 is formed by one single loop.

The sensor unit 25 also contains a receive circuit 35 having at least a first receive coil set 36 and a second receive coil set 37. Each of the receive coil sets 36, 37 contains at least two receive coils 45 (compare e.g. FIG. 6b) each providing a receive signal between respective terminals 38. The receive signal corresponds to a voltage induced in the respective receive coil 45. The induced voltages are supplied to an evaluation unit 39 of the receive circuit 35. The evaluation unit 39 is adapted to determine the relative position between the sensor unit 25 and the scale unit 24 based on the receive signals and in the present embodiment based on the two induced voltages from each of the two sets of coils. From the voltages in one receive coil set 36, 37 a first spatial phase can be determined. From the voltages in the second receive coil set a second spatial phase can be determined. The two spatial phases can be combined for position determination.

It is noted that in the drawings (apart from FIG. 6b) only one receive coil represents the respective receive coil set 36 and 37 for sake of simplicity in the illustration only.

Figure 7:
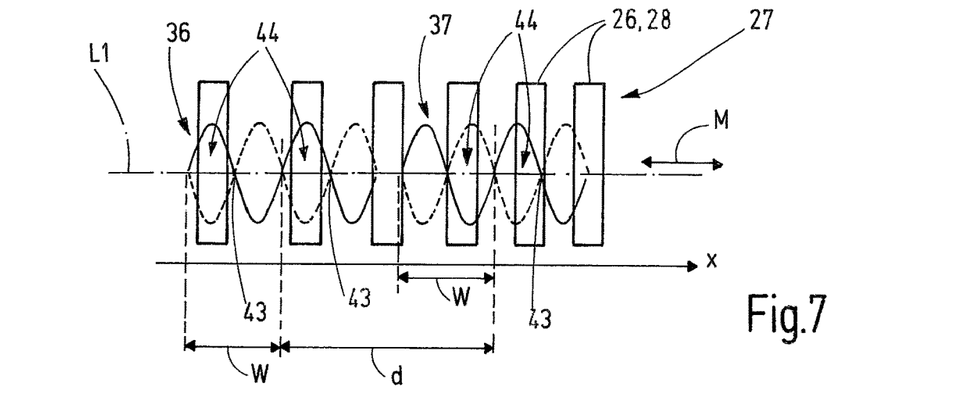
FIG. 7 shows a schematic illustration of a first and a second receive coil set and one line of scale elements.

The first receive coil set 36 and the second receive coil set 37 extend preferably along a common first longitudinal axis L1 that extends in measuring direction M (FIG. 7). Each receive coil of each receive coil set 36, 37 has a mirror symmetric shape or contour with regard to the first longitudinal axis L1. Preferably the first and the second receive coil set 36, 37 are identical. The first receive coil set 36 can be moved in measuring direction onto the second receive coil set 37, so that both receive coil sets coincide.

Figure 5:
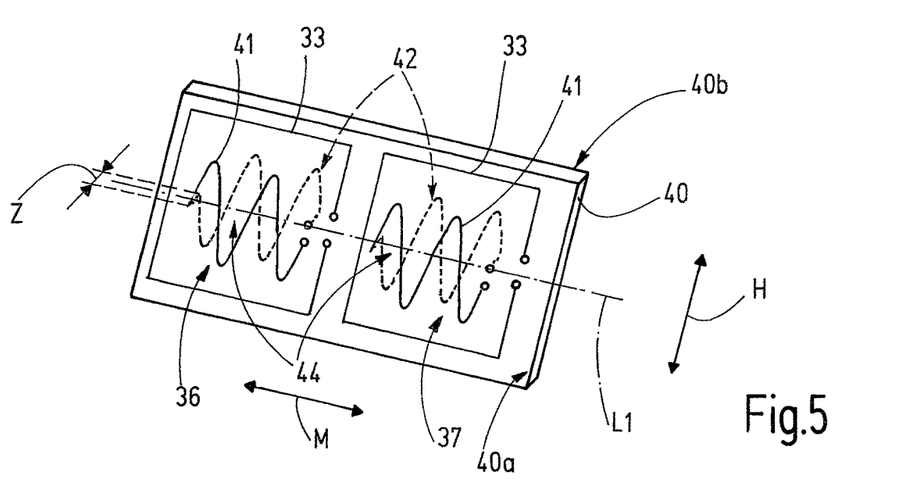
FIGS. 5 and 6a are schematic perspective illustrations of exemplary receive coil sets arranged on a circuit board.
Figure 6A:
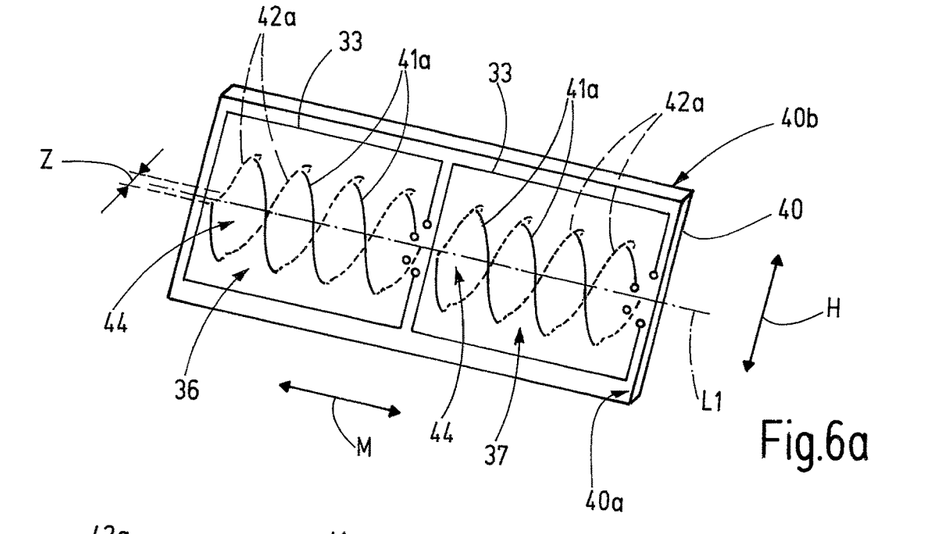

As illustrated schematically in FIGS. 5 and 6a, the receive coil sets 36, 37 and optionally also the at least one transmit coil 33 can be arranged on a common circuit board 40. In these embodiments a separate transmit coil 33 is assigned to the first receive coil set 36 and the second receive coil set 37. The respective transmit coil 33 can surround the associated receive coil set 36, 37 respectively. In the present embodiment the transmit coils 33 are arranged on one common layer 40a of the circuit board 40. The connection to the AC voltage source 34 is not shown.

Each receive coil 45 of the receive coil sets 36, 37 can be formed by a first conductor 41 and a second conductor 42 that are provided in different layers 40a and 40b of the circuit board 43. In FIG. 5, each of the conductors 41, 42 has an alternating run with regard to the first longitudinal axis L1. The conductors cross each other at crossing locations 43 without being electrically connected at these crossing locations 43 and thus form coil loops 44 (compare also FIGS. 7, 11 and 12). Due to the distance z of the layers 40a and 40b, the conductors 41, 42 are offset in the direction normal to the plane in which the circuit board 40 extends (which is normal to the height direction H and normal to the measuring direction M).

Each of the receive coils 45 has a number of coil loops 44 that are arranged directly adjacent to each other in measuring direction M.

In the embodiment according to FIG. 5, the conductors 41 and 42 have a continuous run between the ends of a respective receive coil in one layer. The conductors 41, 42 are short-circuited on one end of the respective receive coil opposite to the terminals 38.

Figure 6B:
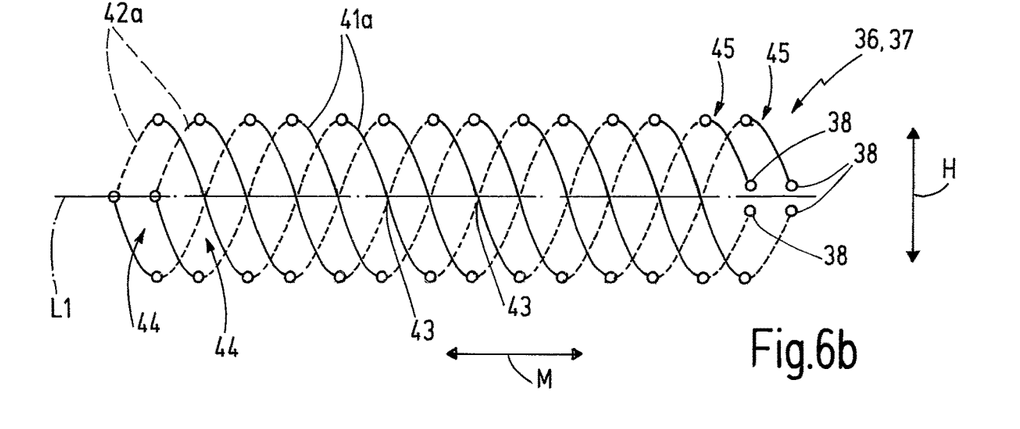
FIG. 6b is a schematic illustration of an embodiment of a receive coil set with interleaved receive coils.

In a different embodiment (FIGS. 6a and 6b), the first conductor 41 and the second conductor 42 are separated into individual conductor portions 41a and 42a respectively. Two first conductor portions 41a directly adjacent to each other in measuring direction M are electrically connected by one second conductor portion 42a of a second conductor 42 and vice versa. This requires a higher number of vias compared with the embodiment of FIG. 5. But this embodiment allows to provide interleaved receive coils 45 in each of the receive coil sets 36, 37 without the need for additional layers as shown in FIG. 6b. As illustrated the two receive coils 45 of one common set are displaced along the first longitudinal axis L1 in measuring direction M by preferably one quarter of a wavelength w. Each set could also contain more than one receive coil 45.

In both examples shown in FIGS. 5 and 6 the basic shape of the coil loops 44 is similar. At one side of the first longitudinal axis L1, each coil loop 44 has a sinusoidal contour created by the run of respective portion(s) of the at least one conductor 41, 42. At the other side of the first longitudinal axis L1 the contour of the coil loop 44 is mirror symmetric. In other words, each coil loop 44 is created by a positive half wave and mirror symmetric negative half wave of a sinusoidal run of the at least one conductor 41, 42 on the respective sides of the first longitudinal axis L1.

The distance between crossing locations 43 that are directly adjacent to each other in measuring direction M corresponds to a half wavelength. The wavelength w of each receive coil 45 is constant. The receive coils 45 first receive coil set 36 and the second receive coil set 37 can have the same wavelength w (compare FIG. 7).

In the present embodiment the length of the first and second receive coil set 36, 37 is equal. The first receive coil set 36 and the second receive coil set 37 are offset by a coil distance d from each other along the first longitudinal axis L1. The coil distance d is longer than the length of the first receive coil set 36 and the second receive coil set 37 in measuring direction M. Accordingly, a gap is present at the first longitudinal axis L1 between one end of the first receive coil set 36 and the respective adjacent end of the second receive coil set 37. The two receive coil sets 36, 37 do not overlap.

In the illustrated embodiments the scale unit 24 is longer in measuring direction M than the sensor unit 25 with the receive coil sets 36, 37 and with the at least one transmit coil 33. In other embodiments it would also be possible that the transmit coil 33 is provided at the member having the longer extension in measuring direction M and that a shorter member having a number of field-influencing scale elements 26 moves along the transmit coil 33. The key feature is that a field pattern P(x) is created and that the receive coil sets 36, 37 detect the respective field pattern P(x) for position determination.

Figure 4:
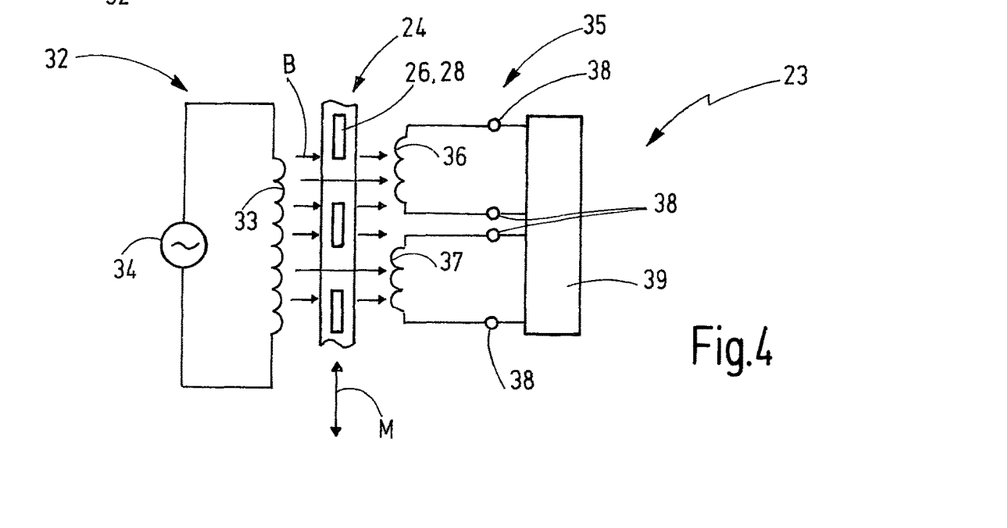
FIG. 4 is a diagram schematically illustrating the function principle of the inductive sensor device.

The basic principle of an inductive sensor is shown in FIG. 4. The at least one transmit coil 33 creates a magnetic field B. The magnetic flux through the coil loops 44 of the respective receive coil sets 36, 37 depends on the relative position between the sensor unit 25 and the scale unit 24 in measuring direction M. The induced voltages of each receive coil 45 provide a spatial or position phase. The two spatial phases are used for an absolute position determination in the receive circuit 35.

According to a first embodiment, only one single line 27 of scale elements 26 or scale loops 28 is provided. The scale elements 26 are preferably rectangular. They have in measuring direction M a loop front and a loop back at opposite sides that correspond to each other. This means that the loop front can be shifted onto the loop back in measuring direction M so that loop front and loop back coincide completely. In the present embodiment the loop front and the loop back extend linear in height direction H.

The scale elements 26 of one common line 27 are arranged at a varying pitch depending on the position x. All scale elements 26 of a common line 27 have the same dimension b in measuring direction M. The varying pitch is thus created by a varying spacing s(x) that depends on the position variable x (FIG. 2). The spacing is defined by means of a non-linear phase function $\Phi$ that defines the relationship between a wrapped first phase $\varphi_1$ of the first receive coil set 36 and a wrapped second phase $\varphi_2$ of the second receive coil set 37 and the position variable x:

$$\varphi_1 = \mod(\varphi(x), 1) \tag{1}$$

$$\varphi_2 = \mod(\varphi(x+d), 1) \tag{2}$$

The couplings $C_1$, $C_2$ of the receive coils 45 of the first receive coil set 36 are as follows:

$$C_1(x) = A \cos(2\pi\Phi(x)) \tag{3}$$

$$C_2(x) = A \sin(2\pi\Phi(x)) \tag{4}$$

The phase function $\Phi(x)$ can be defined as follows:

$$\varphi_1(x) = a \tan 2(C_1(x), C_2(x))/(2\pi) \tag{5}$$

and $\Phi(x)$ is $\varphi_1(x)$ unwrapped.

In general it is possible to indicate the phase function $\Phi$ in form of a series:

$$\Phi(x) = \Sigma_{i=0}^n k_i x^i \tag{6}$$

In the present example the phase function $\Phi$ can be defined as follows:

$$\Phi(x) = x + 0.05 \cdot x^2 \tag{7}$$

Figure 9:
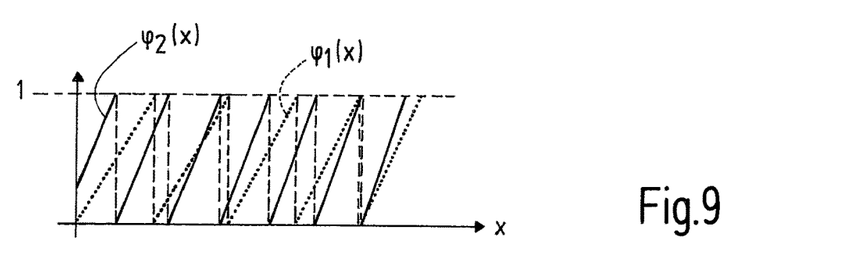
FIG. 9 shows a first spatial phase and a second spatial phase of the receive signals received by the first receive coil set and the second receive coil set depending on a position variable x that describes the position in measuring direction.

The first and second receive coil sets 36, 37 thus measure a wrapped first phase $\varphi_1(x)$ and a wrapped second phase $\varphi_2(x)$, as shown in FIG. 9. The wrapped phases can be determined by:

$$\varphi_1(x) = \mod(\Phi(x), 1) \tag{8}$$

$$\varphi_2(x) = \mod(\Phi(x+d), 1) \tag{9}$$

As can be seen in FIG. 9, the second phase $\varphi_2(x)$ ramps more quickly than the first phase $\varphi(x)$. From these two phases the position x can be unambiguously determined. The advantage of the present invention is, that both phases are measured from one single track or line 27, so that the required space for the inductive sensor device 23 can be reduced particularly in height direction H.

Figure 10:
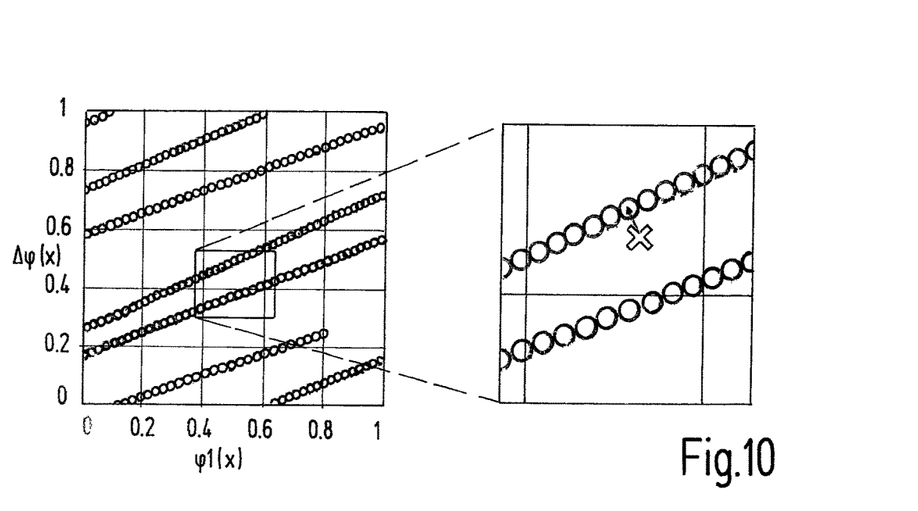
FIG. 10 shows the phase difference between the first spatial phase and the second spatial phase depending on the first phase.

FIG. 10 shows the range over which the position x can be determined unambiguously by illustrating the locus of the points ($\varphi_1(x)$, $\varphi_2(x)$) by means of increments in the position x, for example increments of 0.02. The points in the illustration of FIG. 10 continue from the right-hand edge at the left-hand edge and from the top edge at the bottom edge. The line of locus points thus continuously winds around a torus. In a range where it never crosses itself, each locus point can be unambiguously associated with one specific position value x.

In FIG. 10 it is schematically shown that, due to noise or other disturbances, a measured point (cross in FIG. 10 in the right picture) can be offset from the possible locus points. The position can then be estimated by using a mathematical function—like the least squares method—in order to find the locus point that is closest to the measured point shown by the cross in FIG. 10.

The determination in the evaluation unit 39 to determine the position x can be made by means of a look-up table or by calculation based on the phase function $\Phi(x)$. In the example above, the wrapped phase difference $\Delta\varphi$ is as follows:

$$\Delta\varphi(x) = \varphi_2(x) - \varphi_1(x) = \mod(k_1 d + k_2 d^2 + 2k_2 dx, 1) \tag{10}$$

This is a linear function of x that allows a simple determination of x. For a long-range sensor the expression $2k_2 dx$ would be much smaller than $k_1$. Consequently the position x can only be determined with a lower precision from the phase difference. For a higher accuracy of position determination the dependency of one of the first phase $\varphi_1$ or second phase $\varphi_2$ could be used directly to calculate the position value x. In so doing, a coarse position determination by means of a phase difference and a more precise position determination by using one of the phases only can be established.

Figure 11:
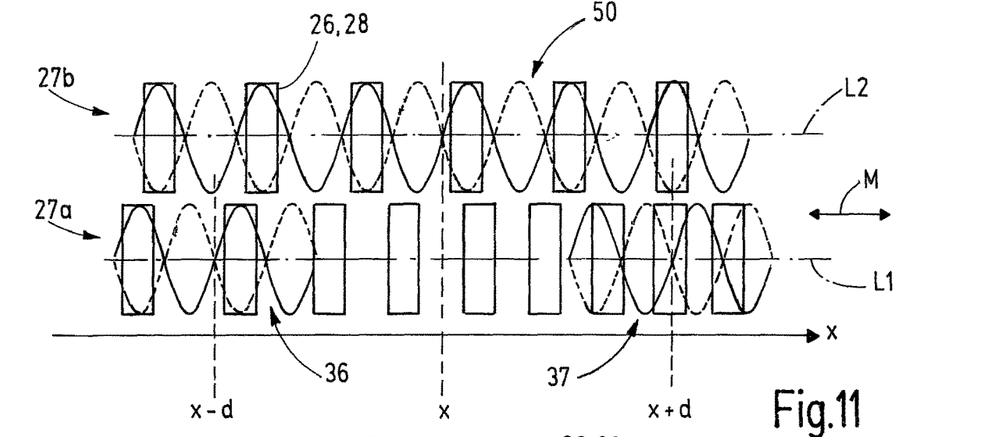
FIG. 11 shows another embodiment having an additional, third receive coil set assigned to an additional line of scale elements, wherein this additional line has a constant spacing between the scale elements.
Figure 12:
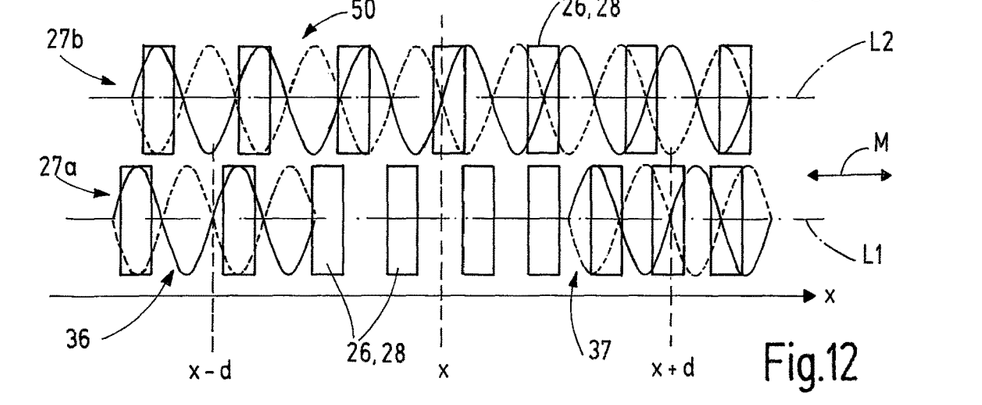
FIG. 12 shows another embodiment having a third receive coil set assigned to an additional line of scale elements, having a varying spacing that differs from the variation of the spacing of the other line of scale elements

Different to the embodiment described above, it is also possible to use a first line 27a and a second line 27b of scale elements 26 as shown in FIGS. 11 and 12. The first line 27a corresponds to the single line 27 described above to which the first receive coil set 36 and the second receive coil set 37 are assigned. The additional second line 27b can have a constant pitch or spacing s of the scale elements in the second line 27b, as shown in FIG. 11. Alternatively the spacing in the second line 27b can vary depending on the position x, as schematically illustrated in FIG. 12. A third receive coil set 50 of the sensor unit 25 is assigned to the second line 27b of scale elements 26. In the present embodiment the length of the third receive coil set 50 is longer than the length of the first and second receive coil sets 36, 37. Preferably the wavelength w of the receive coils 45 of the third receive coil set 50 is identical to the wavelength w of the receive coils 45 of the first and second receive coil sets 36, 37. The third receive coil set 50 can be provided on the circuit board 40. An additional third transmit coil 33 can be assigned to the third receive coil set 50 in a similar way, as described above with regard to the other receive coils 36, 37. The third receive coil set 50 extends in measuring direction M along a second longitudinal axis L2 and is mirror symmetric with regard to this second longitudinal axis L2. The second longitudinal axis L2 extends parallel to the first longitudinal axis L1.

In the example of FIG. 11 the second line 27b is a track without phase modulation (phase function $\Phi_b$). Similar to equations (8) and (9) the three receive coil sets measure the following wrapped phases:

$$\varphi_1(x) = \mathrm{mod}(\Phi_a(x-d), 1) \quad (11)$$

$$\varphi_2(x) = \mathrm{mod}(\Phi_a(x+d), 1) \quad (12)$$

$$\varphi_3(x) = \mathrm{mod}(\Phi_b(x), 1) \quad (13)$$

with the first receive coil set 36 shifted in one (minus) direction by a coil distance d and the second receive coil set 37 shifted in the respective other (plus) direction by a coil distance d relative to the third receive coil set 50. The phase functions $\Phi_a$ and $\Phi_b$ can be defined as follows:

$$\Phi_a(x) = k_{a1} \cdot x + k_{a2} \cdot x^2 \quad (14)$$

$$\Phi_b(x) = k_{b1} \cdot x \quad (15)$$

A coarse determination of the position x can be obtained by using the difference between the first phase and the second phase at the first line 27a, which is a simple linear function:

$$\theta_1(x) = \varphi_2(x) - \varphi_1(x) = \mathrm{mod}(2k_{a1}d + 4k_{a2}dx, 1) \quad (16)$$

A more precise resolution for estimating the position x can be obtained by comparing one of the first or second phases from the first line 27a and the third phase from the second line 27b, for example:

$$\theta_2(x) = \tfrac{1}{2}[\varphi_1(x) + \varphi_2(x)] - \varphi_3(x) = \mathrm{mod}((k_{a1} - k_{b1})x + k_{a2}(x^2 + d^2), 1) \quad (17)$$

In a third calculation or estimation step any of the three phases can be used for the most precise resolution for the position determination, preferably the third phase $\varphi_3(x)$ having a constant spacing between the scale elements 26.

Turning to FIG. 12, both lines 27a and 27b contain a spacing (s(x)) varying in measuring direction M. Similar to equation (6) a first phase function $\Phi_a$ for the first line 27a and a second phase function $\Phi_b$ for the second line 27b can be defined as follows:

$$\Phi_a(x) = \sum_{i=0}^{n} k_{ai} x^i \quad (18)$$

$$\Phi_b(x) = \sum_{i=0}^{n} k_{bi} x^i \quad (19)$$

In one preferred embodiment n=2, $k_{a0} = k_{b0}$ and $k_{a2} = k_{b2}$. As described with regard to FIG. 11, a coarse determination of the position x can be achieved by using the phase difference between the first phase and the second phase according to a first phase comparing function $\theta_1(x)$:

$$\theta_1(x) = \varphi_2(x) - \varphi_1(x) = \mathrm{mod}(2k_{a1}d + 4k_{a2}dx, 1) \quad (20)$$

A medium resolution for the position determination can be obtained by comparing all of the phases according to a second phase comparing function $\theta_2(x)$:

$$\theta_2(x) = \tfrac{1}{2}[\varphi_1(x) + \varphi_2(x)] - \varphi_3(x) = \mathrm{mod}((k_{a1} - k_{b1})x + k_{a2}d^2, 1) \quad (21)$$

A fine resolution can be obtained in a third step by using one of the individual phases, e.g. the third phase $\varphi_3(x)$ to determine the position value x.

In general the parameter values of $k_i$ in all of the above-mentioned phase functions can be selected in order to reduce the sensitivity against noise. For two values of the position x separated by one fine pitch of $1/k_{a1}$ the difference in the values of $\theta_2(x)$ should be some multiple of the root mean square noise (RMS noise) on $\theta_2(x)$. Similarly for two values of the position x separated by one medium pitch $1/(k_{a1} - k_{b1})$ the difference in the values of $\theta_1(x)$ should be some multiple of the root mean square noise (RMS noise) on $\theta_1(x)$.

Figure 13:
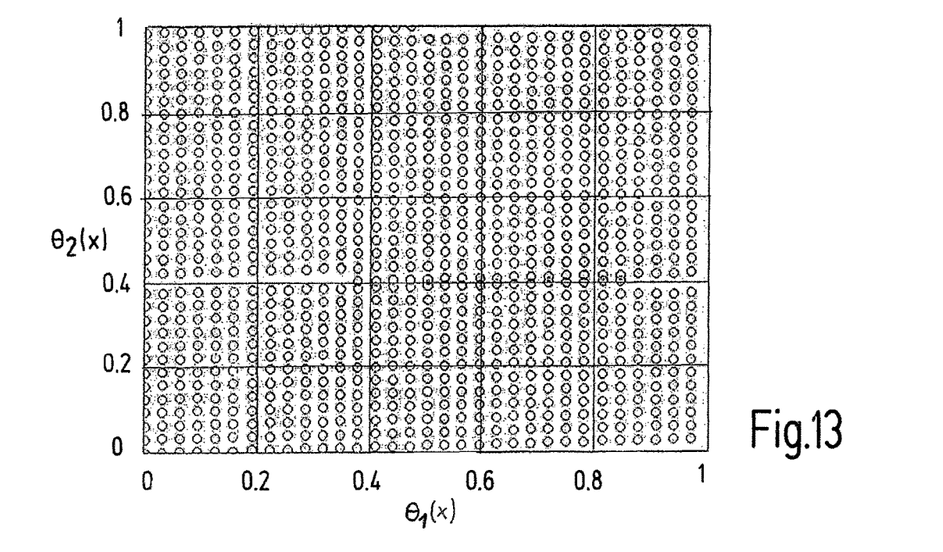
FIG. 13 shows a phase pattern based on the spatial phases of the three receive signals obtained by the first, second and third receive coil set, as shown in FIGS. 11 and 12.

FIG. 13 shows an example of locus points for the position x using three phases and the respective phase comparing functions $\theta_1(x)$ and $\theta_2(x)$.

With an inductive sensor device 23 according to the invention less space is required, since one line 27a of scale elements 26 is sufficient. A low sample rate can be used that reduces power consumption, which is important for measuring instruments that are energized by means of batteries or accumulators or the like. Only phase measurements are necessary that can be implemented by using simple electronic circuits in the evaluation unit 39. The coupling $C_1$ and $C_2$ can be mixed either with a sinusoidal signal or also with a square wave and the zero crossing timing can be used to determine the phase. When using square waves a lowpass or bandpass filtering can be provided to remove harmonics in the square waves. The zero crossing detection can be obtained by using a comparator.

In some applications it can be advantageous to have a more precise position determination at the end of a movement, e.g. when detecting the movement of a machine part into a specific end position, like a cylinder stroke into an extended or retracted end position. The scale unit can be positioned so that the end having lower spacing or pitch between the scale elements is assigned to the specific end position of the machine part that is to be measured.

The present invention relates to an inductive sensor device 23 having a scale unit 24 and a sensor unit 25 that can be moved relative to each other in a measuring direction M. The scale unit contains scale elements 26 that are adapted to create a field pattern P(x) in measuring direction M that is detected by means of a receive circuit 35 of the sensor unit 25. The receive circuit 35 contains at least a first receive coil set 36 and a second receive coil set 37 that are offset in measuring direction M. In so doing a first spatial phase and a second spatial phase is provided by these receive coil sets 36, 37 respectively. These spatial phases can be used for absolute position determination.

REFERENCE SIGNS 20 measuring instrument
21 inside jaws
22 outside jaws
23 inductive sensor device
24 scale unit
25 sensor unit
26 scale elements
27 line of scale elements
27a first line of scale elements
27b second line of scale elements
28 scale loop
32 transmit circuit
33 transmit coil
34 voltage source
35 receive circuit
36 first receive coil set
37 second receive coil set
38 terminal
39 evaluation unit
40 circuit board
40a layer of the circuit board
40b layer of the circuit board
41 first conductor
41a first conductor section
42 second conductor
42a second conductor section
43 crossing location
44 coil loop
45 receive coil
50 third receive coil set φ₁ first phase
φ₂ second phase
φ₃ third phase
Φ phase function
Φₐ phase function for the first line of scale elements
Φ_b phase function for the second line of scale elements
θ₁ first phase comparing function
θ₂ second phase comparing function
b dimension of scale elements in measuring direction
d coil distance
H height direction
L1 first longitudinal axis
L2 second longitudinal axis
M measuring direction
P(x) field pattern
s(x) spacing
w wavelength of receive coil
x position variable in measuring direction
z distance of layers

The invention claimed is:

1. An inductive sensor device (23) comprising:
a scale unit (24) having scale elements (26) that are arranged in a first line 27a) extending in a measuring direction (M) and that are adapted to create a field pattern (P(x)) in the measuring direction (M), wherein the scale elements (26) are arranged in the first line (27a) at a spacing (s(x)) between two directly adjacent scale elements (26) that varies along the measuring direction (M);
wherein the scale unit (24) comprises a second line (27b) of scale elements (27b);
a sensor unit (25) comprising a receive circuit (35) with at least a first receive coil set (36) and a second receive coil set (37) that are assigned to the first line (27a) of scale elements (26) and displaced relative to each other in the measuring direction (M), and a third receive coil set (50) having at least one receive coil assigned to the second line of scale elements (27b), wherein the sensor unit (25) and the scale unit (24) are moveable relative to each other in measuring direction (M);
wherein the first receive coil set (36) and the second receive coil set (37) are spaced apart by a gap in the measuring direction (M), wherein the receive circuit (35) is adapted to determine first, second and third spatial phases (φ1, φ2, φ3) of the first, second and third receive coil sets (36, 37, 50) respectively and to make a coarse determination of the relative position (x) between the sensor unit (25) and the scale unit (24) by using the difference between the first spatial phase (φ1) of the first receive coil set (36) and the second spatial phase (φ2) of the second receive coil set (37) and to make a more precise determination of the relative position (x) by comparing at least one of the first or second spatial phases (φ1, φ2) with the third spatial phase (φ3).

2. The inductive sensor device according to claim 1, wherein the spacing (s(x)) between the scale elements (26) of the first line (27a) is defined by a non-linear function depending on a position (x) in the measuring direction (M).

3. The inductive sensor device according to claim 1, wherein the first receive coil set (36) and the second receive coil set (37) have a same length in the measuring direction (M).

4. The inductive sensor device according to claim 1, wherein the second line (27b) of scale elements (26) has a constant spacing.

5. The inductive sensor device according to claim 1, wherein the first line (27a) of scale elements (26) have a first spacing defined by a non-linear first function and the second line (27b) of scale elements (26) have a second spacing defined by a second function.

6. The inductive sensor device according to claim 1, wherein each scale element (26) has at one side in the measuring direction (M) a loop front and at an opposite side in the measuring direction (M) a loop back, wherein the loop front and loop back have identical shapes.

7. The inductive sensor device according to claim 1, wherein the scale elements (26) contain or are formed by scale loops (28) that are arranged adjacent to each other in the measuring direction (M).

8. The inductive sensor device according to claim 1, wherein the first and second receive coil sets (36, 37) each contain at least two receive coils (45).

9. The inductive sensor device according to claim 1, further comprising a transmit circuit (32) having at least one transmit coil (33) adapted to create a magnetic field (B); wherein the scale elements (26) are passive field-influencing elements provided to influence the magnetic field (B) of the at least one transmit coil (33) to create the field pattern (P(x)).

10. The inductive sensor device according to claim 1, wherein the receive circuit (35) is adapted to determine the spatial phases (φ₁, φ₂, φ₃) of the receive coil sets (36, 37, 50) as follows:

$\varphi_1(x) = \mod(\Phi_a(x-d), 1),$ $\varphi_2(x) = \mod(\Phi_a(x+d), 1)$ and $\varphi_3(x) = \mod(\Phi_b(x), 1)$ with the first receive coil set (36) shifted in one direction by a coil distance (d) and the second receive coil set (37) shifted in a direction opposite to the one direction by the coil distance (d) relative to the third receive coil set (50).

11. The inductive sensor device according to claim 10, wherein phase functions $\Phi_a$ and $\Phi_b$ are defined as follows:
$\Phi_a(x) = k_{a1} \cdot k_{a2} \cdot x^2$ and $\Phi_b(x) = k_{b1} \cdot x$.

12. The inductive sensor device according to claim 10, wherein the coarse determination of the relative position (x) is obtained by using a phase comparing function $\theta_1(x) \equiv \varphi_2(x) - \varphi_1(x)$ and the more precise determination of the relative position (x) is obtained by using another phase comparing function $\theta_2(x) \equiv \frac{1}{2}[\varphi_1(x) + \varphi_2(X)] - \varphi_3(x)$.

13. The inductive sensor device according to claim 1, wherein the receive circuit (35) is adapted to use any of the three spatial phases (φ1, φ2, φ3) of the first, second and third receive coil sets (36, 37, 50) in an additional calculation or estimation step for the more precise resolution for the determination of the relative position (x).

14. The inductive sensor device according to claim 1, wherein the third receive coil set (50) has a length in the measuring direction (M) larger than a length of at least one of the first and second receive coil set (36, 37) in the measuring direction (M).

15. The inductive sensor device according to claim 14, wherein length of the third receive coil set (50) in the measuring direction (M) is 1.5 times to 2.5 times longer than the length of the first or second receive coil set (36, 37) in the measuring direction (M).

* * * * *